April 1, 1952     D. R. DE BOISBLANC     2,591,053
LEAK COMPENSATED CAPACITOR
Filed July 24, 1947
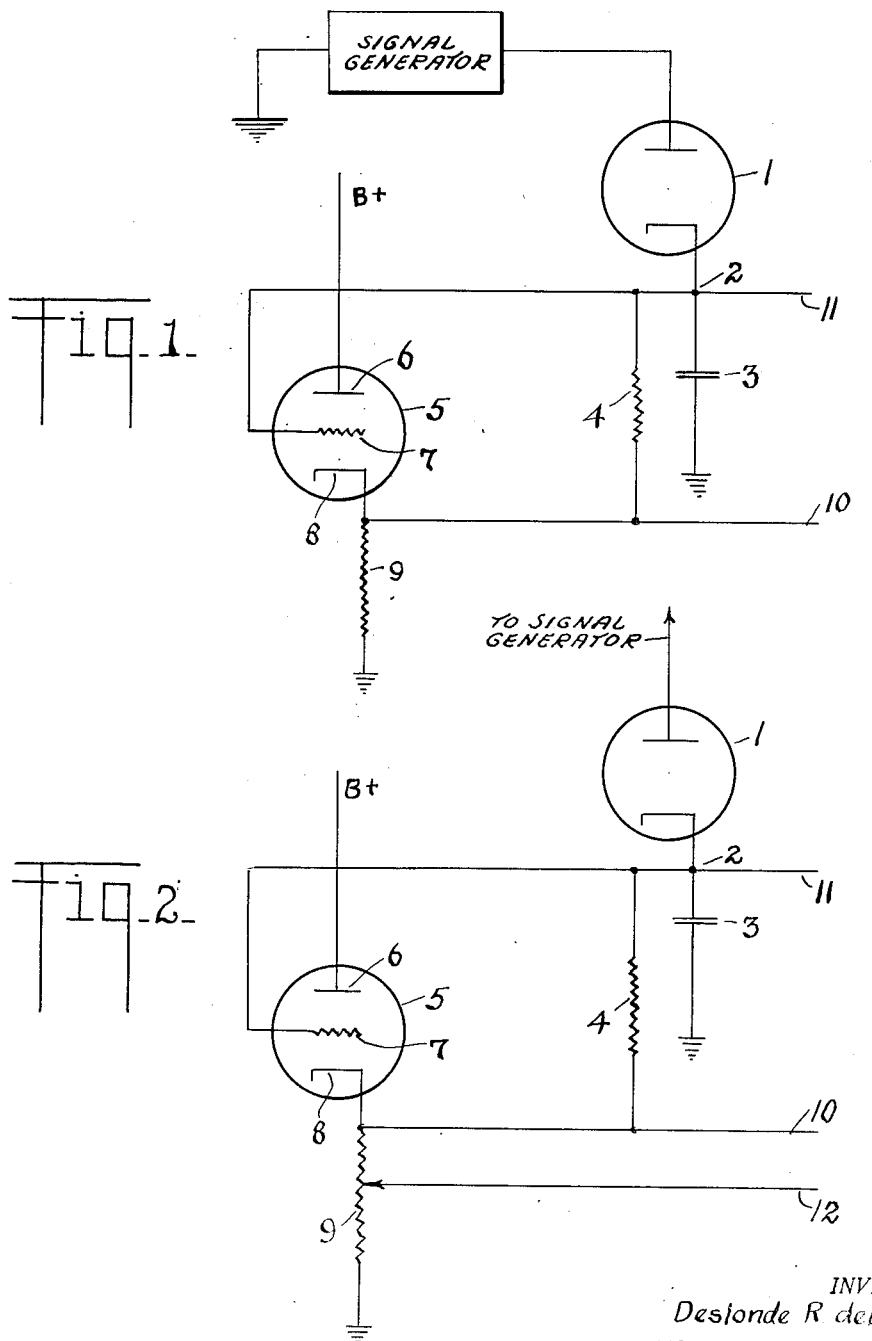
INVENTOR.
Deslonde R. deBoisblanc
BY
Darby & Darby
Att'ys.

Patented Apr. 1, 1952

2,591,053

UNITED STATES PATENT OFFICE 2,591,053

LEAK COMPENSATED CAPACITOR

Deslonde R. de Boisblanc, Bartlesville, Okla., assignor to Phillips Petroleum Company, a corporation of Delaware Application July 24, 1947, Serial No. 763,403

10 Claims. (Cl. 250—27)

1

This invention relates to a combination including a capacitor by means of which leakage inherent in capacitors is automatically compensated.

The general object of this invention is to provide in combination with an electric capacitor, a network operating in conjunction therewith to automatically compensate for the inherent charge leakage of the capacitor.

Other and more detailed objects of the invention will be apparent from the following description of the embodiments thereof shown in the attached drawing.

This invention resides substantially in the combination, construction, arrangement and relative location of parts, all as will be hereinafter described.

In the accompanying drawings—

Figure 1 is a diagrammatic illustration of one embodiment of the invention; and

Figure 2 is a diagrammatic illustration of a modification of the system of Figure 1.

The invention herein disclosed comprises a novel circuit for maintaining the charge on an electric capacitor over a substantial period of time as, for example, until a predetermined number of pulses have accumulated therein, as for example N pulses, where N can be an integer. The combination can be used as a part of more complex systems by means of which N pulses can be accumulated on the capacitor and then discharged. An example of a system employing the subject matter of this invention is disclosed in my copending application Serial No. 524,502, filed February 29, 1944, for "Detonation Meter," now Patent No. 2,496,336, granted February 7, 1950, of which this application is a continuation in part.

In many circuits such as in detonation meters, it is necessary to accumulate pulses on a capacitor. In this and many other situations there is a time lapse from the instant of the first pulse arrival to the arival of the Nth pulse, at which time the capacitor is discharged. During the period of accumulation of pulses or charges there is a normal leakage from the capacitor and it is the purpose of this invention to provide means for maintaining the charge on the capacitor during the time interval of accumulating N pulses or charges. In accordance with the system herein disclosed, any leakage of current is automatically supplied by a compensating circuit so that when the condenser is discharged after the accumulation of N pulses it contains a charge equivalent to the full amount placed therein.

The manner in which these objectives are accomplished will be evident by referring to Figure 1. The capacitor to be protected against leakage is indicated at 3, and is shown with one terminal grounded and the other terminal connected at 2 to the cathode of a tube which supplies the charging current, in this case the vacuum tube 1. The charging pulses are applied to the capacitor 3 by means of the rectifying diode 1. The source of charges and their timing is of no particular consequence to a full understanding of this invention. However, as the time between pulses may vary and be of the order of several seconds or more, leakage would naturally occur as all capacitors are inherently subject to some leakage. Any leakage will result in a decrease in the voltage applied by the condenser at the time of discharge, as for example, on the take-off lead 11. To prevent this leakage, the connection point 2 is connected to the grid 7 of a vacuum tube triode 5 and also by means of the resistance 4 to the cathode 8 of the triode. The plate 6 of the triode, of course, is connected to a suitable current source. The cathode 8 is connected to ground through the resistance 9. The triode provides a compensating and regulating circuit to replenish that portion of the charge which naturally leaks from the capacitor 3.

Current from the plate 6 of the tube 5 flows to the cathode 8 and through resistance 9 to ground, the amount of current being governed by the charge on capacitor 3, the voltage of which is also applied to the grid 7. There is a small current which will flow through resistor 9 from vacuum tube 5 even when no voltage is present on the capacitor. Because of the small voltage developed by this zero signal current, and the voltage amplification of the tube for large values of resistance 9 is approximately unity, the voltage across 9 will always exceed the voltage on the condenser 3. Therefore, as the voltage represented by the charge in the capacitor 3 increases so does the current flowing through resistor 9 and, therefore, a very small current flows into capacitor 3 through the resistor 4, supplying the charge lost by leakage. Thus the voltage of capacitor 3 remains substantially constant between pulses and is raised only by the next pulse applied across the point 2 and ground by means of the rectifying tube 1. The take-off lead 11 is connected to a grounded voltmeter if it is desired to read the charge on the condenser, or to a thyratron or other apparatus to be operated upon the accumulation of a predetermined charge of the capacitor 3 representative, for example, of the summation of N pulses as previously stated. The voltmeter, thyratron, or other device can also be connected to the take-off lead 10 which is substantially at the same potential as the lead 11 minus only the small voltage drop through resistor 4, due to replacement current.

The modification of Figure 2 differs only in that the take-off lead is provided at 12 and is connected to a movable contact forming part of the resistor 9 or, in other words, a potentiometer tap. By means of this arrangement, the voltage taken off of the tap 12 may be any predetermined proportion of the voltage developed across resistance 9. Upon consideration it will be seen that this voltage varies in the same manner as the condenser voltage. If resistor 4 is small in relation to resistor 9 the voltage developed across the latter can be made substantially equal to the voltage of the capacitor 3. Resistor 4 is in most cases larger than resistor 9. The value of resistor 4 depends upon the leakage resistance of the capacitor 3 for a given triode and is adjusted so that the leakage current and the replacement current are nearly equal or are equal in the middle of the operating extremes of voltage on the capacitor. With this arrangement the voltmeter, thyratron or other equipment will be connected between ground and tap 12. By positioning the movable tap of the resistor 9 the number of pulses applied to capacitor 3 to effect firing of a thyratron tube connected to the tap 12 may be varied. The actual value of N may be any positive integer from one to any reasonably higher desired number. Circuit technicians will appreciate that when N is equal to a very high number rather exact values of the circuit characteristics will be required. On the other hand, for relatively low values of N the circuit is not so critical.

It is hardly necessary to note that the use of the diode 1 is not essential since any source of direct current pulses which will not ground the connection point 2 for capacitor 3 can be used.

From the above description it will be apparent to those skilled in the art that the subject matter of this invention is capable of some variation, and I do not, therefore, desire to be strictly limited to the embodiments used here for purposes of limitation. I prefer to be limited by the claims.

What is claimed is:

1. A combination as described comprising a capacitor, means for applying a charge to said capacitor, a triode vacuum tube having its grid connected to said means and to one terminal of said capacitor and its cathode connected through an impedance to the other terminal of said capacitor and an impedance shunted across said grid and cathode whereby any leakage of the charge from said capacitor is replaced as a result of current flow through said triode and said last impedance.

2. In the combination of claim 1, a work circuit connected to said capacitor.

3. In the combination of claim 1, said impedances comprising resistors.

4. In the combination of claim 1, said impedances comprising resistors, which resistors connected across said grid and cathode have a value such that the voltage drop thereacross supplies a charge numerically equal to the leakage charge to said capacitor.

5. In the combination of claim 1, said means for supplying a charge to said capacitor comprising a source of uni-directional current pulses.

6. In the combination of claim 1, said means for supplying a charge to said capacitor comprising a source of uni-directional current pulses, comprising a diode.

7. In the combination of claim 1, said impedances comprising resistors and a work circuit including at least a portion of one of said resistors.

8. In the combination of claim 1, said impedances comprising resistors of which the latter is larger than the former.

9. The combination as described comprising, a capacitor, charging means for said capacitor, a vacuum tube having at least a cathode, anode, and grid having its grid connected directly to one terminal of said capacitor and its cathode connected through a resistor to said charging means and to the other terminal of said capacitor, and a resistor shunted across said grid and cathode whereby leakage of charge from said capacitor is replaced by current flow through said triode and said shunt resistor.

10. A combination as described comprising a capacitor, means for applying a charge to one terminal of said capacitor, a vacuum tube triode having a cathode, plate and grid, a connection from said terminal to said grid, a connection including an impedance from said cathode to the other terminal of said capacitor, and a second impedance connected across said grid and cathode.

DESLONDE R. DE BOISBLANC.

REFERENCES CITED

The following references are of record in the file of this patent:

UNITED STATES PATENTS

| Number | Name | Date |
|---|---|---|
| 2,367,049 | Petty | Jan. 9, 1945 |
| 2,399,213 | Edwards | Apr. 30, 1946 |
| 2,419,340 | Easton | Apr. 22, 1947 |

FOREIGN PATENTS

| Number | Country | Date |
|---|---|---|
| 113,839 | Australia | Sept. 10, 1941 |